Oct. 6, 1959 R. B. SHEARER 2,907,038
FASTENER DRIVING DEVICE
Filed July 28, 1955 5 Sheets-Sheet 5
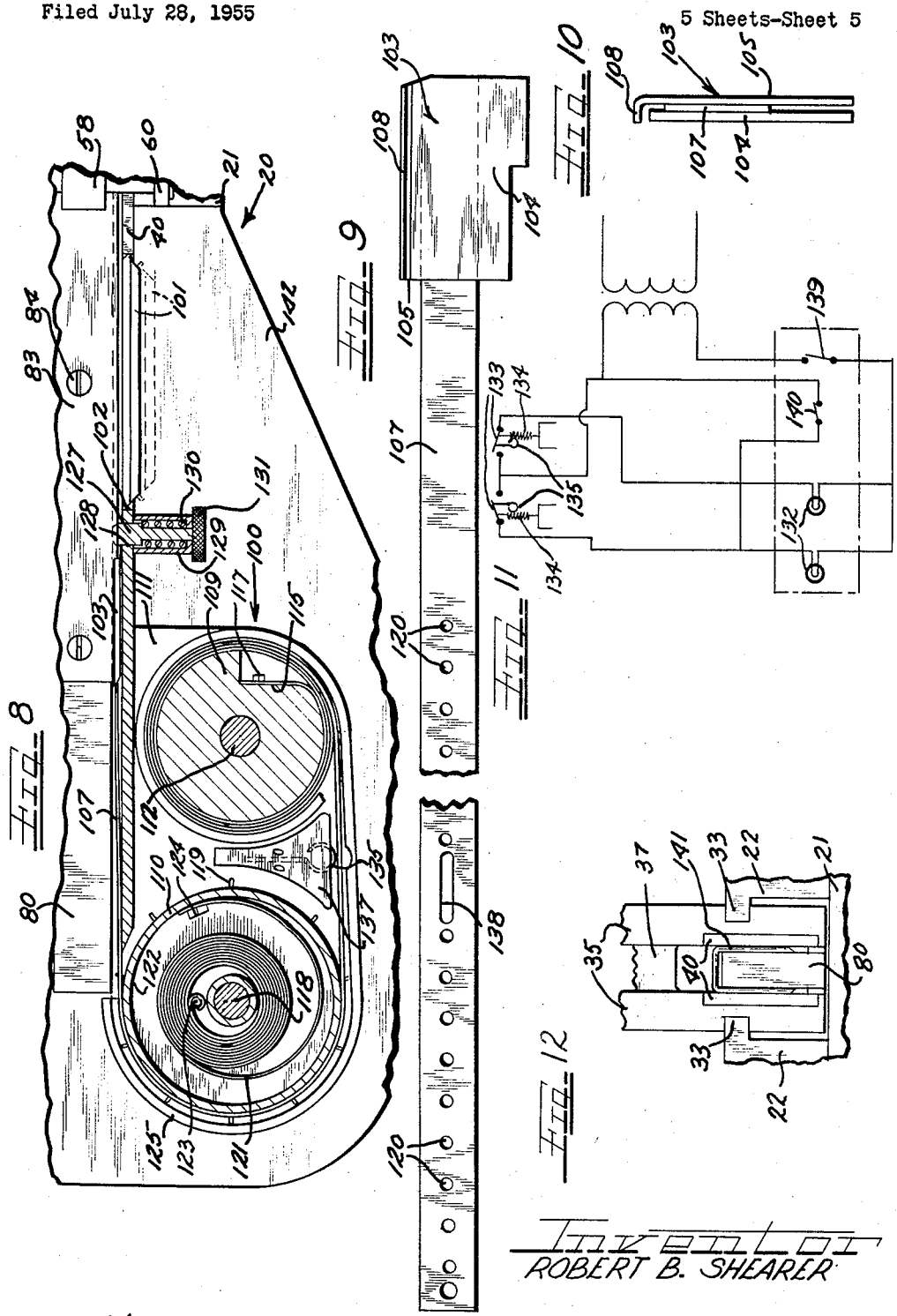
INVENTOR
ROBERT B. SHEARER

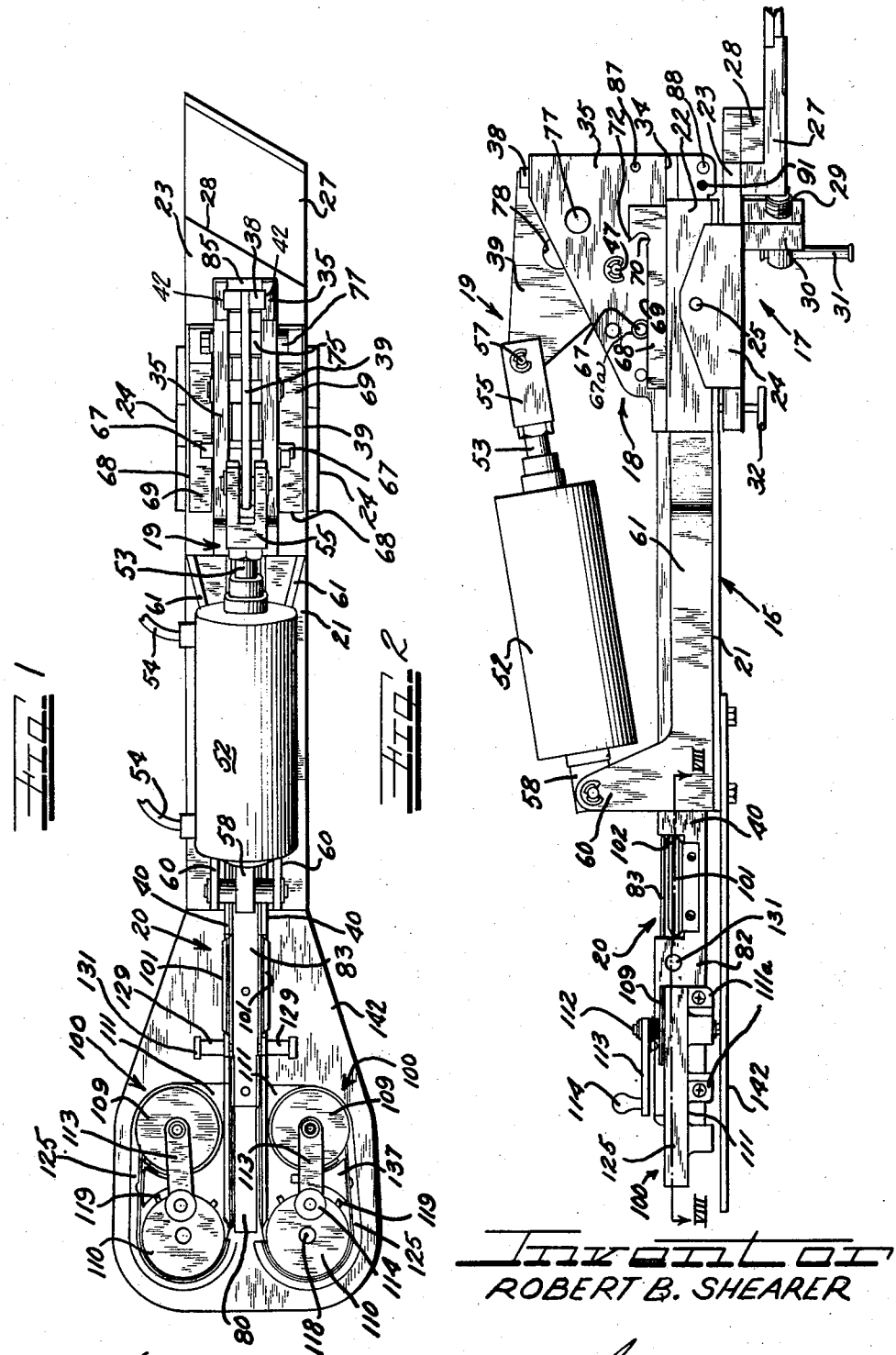

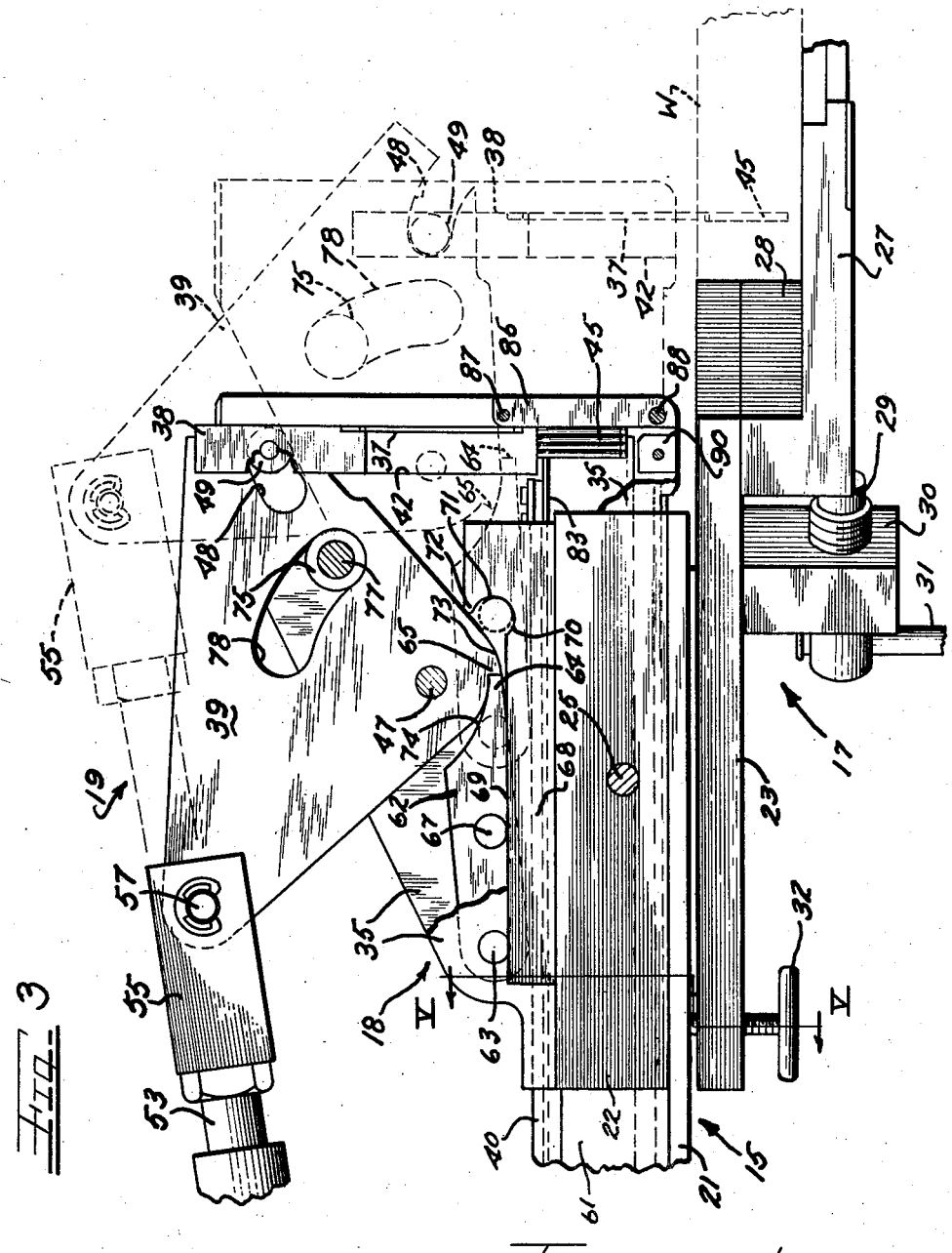

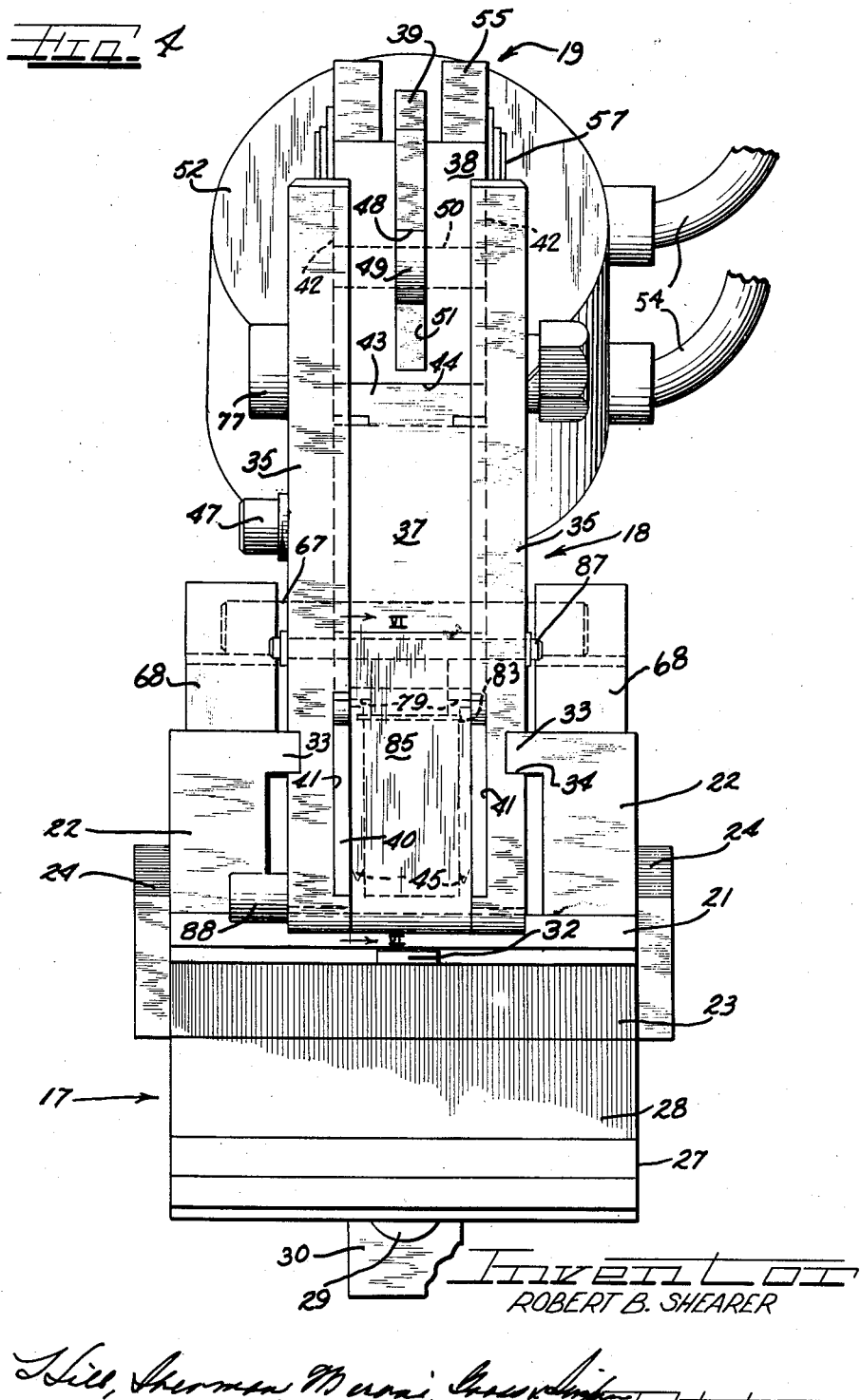

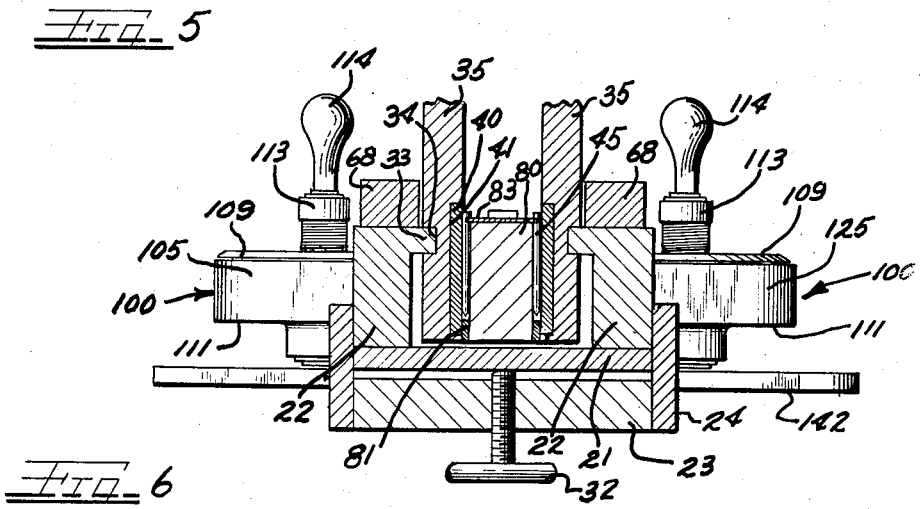
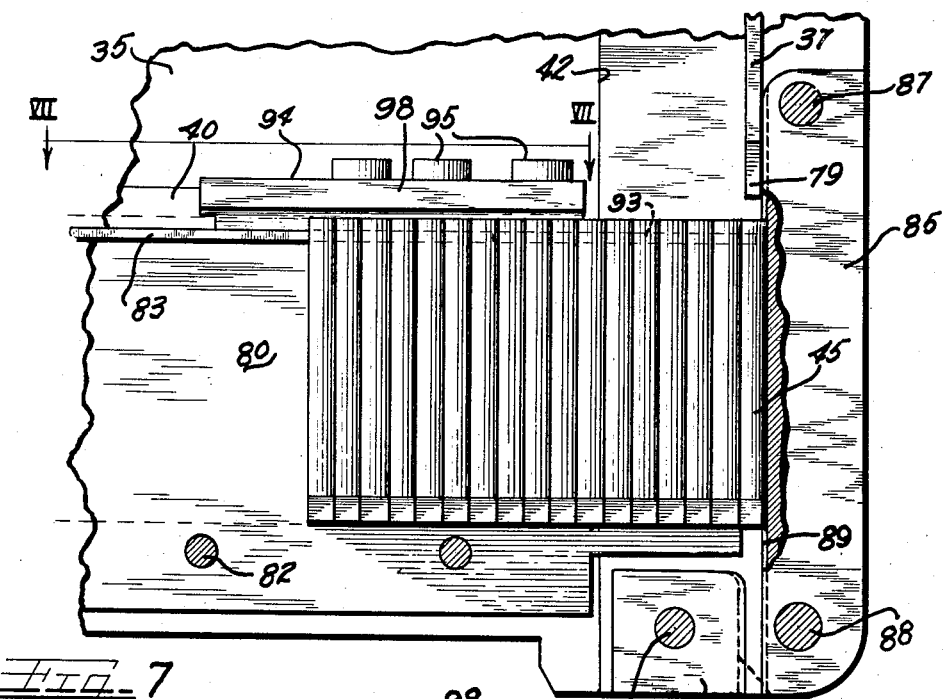
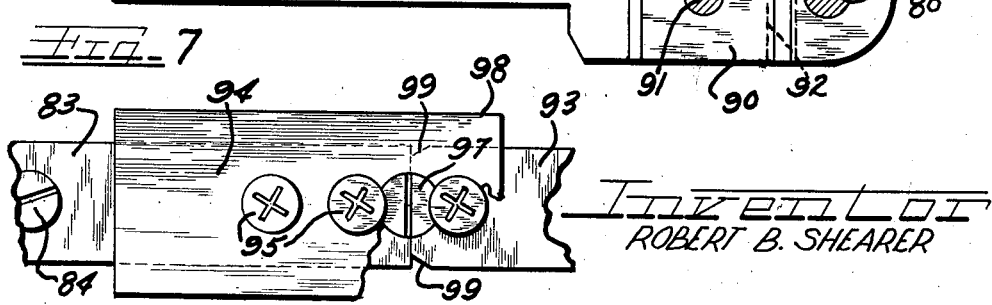

United States Patent Office 2,907,038
Patented Oct. 6, 1959

2,907,038

FASTENER DRIVING DEVICE

Robert B. Shearer, Park Ridge, Ill., assignor to Spotnails, Inc., Evanston, Ill., a corporation of Illinois Application July 28, 1955, Serial No. 525,029

11 Claims. (Cl. 1—3)

The present invention relates to improvements in fastner driving devices, and more particularly concerns devices of this kind that are operable automatically or semi-automatically and are especially adapted for industrial uses.

In the manufacture of wooden window sash, wooden doors, and the like, joined elements of these structures are secured together by fasteners which may be in the form of pin-like nails. Similar fasteners or staples may be utilized in securing the backs to wooden cabinets and the like.

Prior attempts in this direction have resulted in unduly complex structures which have in some instances been unwieldy and in any event lacking in versatility primarily due to specialty construction to meet a single requirement as to size or shape.

It is accordingly an important object of the present invention to provide an industrial fastener driving machine which is of fairly simple construction, simple and positive in operation, and extremely versatile as to mounting, type of work to be fastened, and the type of fastener for which the device may be adapted.

Another object of the invention is to provide an improved fastener driving device that is adapted for automatic or semi-automatic operation by means of fluid pressure.

A further object of the invention is to provide an industrial type fastener driving and setting device adapted for ready mounting upon or removal from apparatus such as a clamp structure or the like with which the device is to be used for fastening work supported in or by the apparatus.

Still another object of the invention is to provide a fastener driving device adapted to be mounted upon associated apparatus and having means for avoiding imposition of any strains upon the associated apparatus incident to driving thrusts generated in the operation of the fastener device.

Yet another object of the invention is to provide improved means in a fastener driving device for movement into and out of superimposed relation to work to be operated on.

It is another object of the invention to provide in an industrial fastener driving and setting device improved means for carrying fasteners into position over the work and for driving and setting the fasteners after they have been thus moved into position.

A still further object of the invention is to provide improved means in an industrial fastener driving and setting device for supporting and feeding into driving position a supply of fasteners to be driven.

Other objects, features and advantages of the present invention will be readily apparent from the following detailed description of certain preferred embodiments thereof taken in conjunction with the accompanying drawings in which:

Figure 1 is a top plan view of a fastener driving device embodying features of the present invention;

Figure 2 is a side elevational view of the fastener driving device of Figure 1;

Figure 3 is an enlarged side elevational view, with parts broken away and in section for clarity of illustration, of the head end portion of the device shown in Figures 1 and 2;

Figure 4 is an enlarged front end elevational view of the device of Figures 1 and 2;

Figure 5 is a sectional detail view taken substantially on the line V—V of Figure 3;

Figure 6 is an enlarged elevational sectional view taken substantially on the line VI—VI of Figure 4;

Figure 7 is a fragmentary detail view taken substantially in the plane of line VII—VII of Figure 6;

Figure 8 is an enlarged fragmentary sectional plan view taken substantially on the line VIII—VIII of Figure 2;

Figure 9 is a fragmental side elevational view of the fastener pusher and pusher band or ribbon utilized in the driver device;

Figure 10 is a front end elevational view of the fastener pusher;

Figure 11 is a schematic wiring diagram of a signal system to show whether the machine is loaded with fasteners to be driven, and to indicate automatically whether the machine is empty of fasteners; and Figure 12 is a fragmentary front end sectional elevational view showing a modification of the machine to adapt the same for driving generally U-shape staples rather than pin-like fasteners.

In Figures 1 and 2, by way of example, is shown a fastener driving device constructed as a self-contained readily mountable and demountable machine including a main carriage body stucture 15 carried by a supporting and attaching structure 17, and in turn supporting operatively a fastener driving head assembly 18, motivating means 19, and fastener magazine, supply assembly 20.

As a principal component, the body structure 15 of the fastener driving device includes a substantially elongated base plate 21 having suitably secured thereto as by means of screws or by welding to the upper face of the front end portion thereof a pair of spaced parallel upwardly projecting and longitudinally elongated head supporting and guide rail side block bars 22 and to which the supporting structure 17 is attached.

Herein the supporting structure 17 is shown as comprising a clamp arrangement by which the device is adapted to be mounted selectively and longitudinally adjustably upon apparatus such as a sash clamp or other work supporting apparatus. To this end, the supporting structure 17 includes a plate body 23 of substantial thickness arranged to underlie the head end portion of the base plate 21. Upstanding from the respective opposite longitudinal sides of the plate body 23 is a pair of supporting ear flanges 24 which are attached pivotally as by means of trunnion pins providing pivots 25 respectively to the head guide rail side bars 22. Such a pivotal attachment is devised to provide a spaced relation between the upper face of the plate body 23 of the supporting structure and the underside or overlying face of the base plate 21 so as to enable adjustment of the head end portion of the body structure 15 and the driving head assembly 18 about the pivots 25 to afford the most efficient vertical disposition of the driving head relative to work that may be supported upon an angular work supporting foot 27 carried by and depending below and projecting forwardly from the forward end portion of the plate body 23. A vertical upwardly extending rear end leg portion 28 of the foot 27 provides a rearwardly directed shoulder cooperative with a clamping screw 29 supported by a depending block boss 30 carried fixedly under the plate body 23 spaced from the foot 27. A handle 31 is provided for manipulating the clamping screw 29. Through this arrangement, the supporting structure 17 is adapted to be mounted upon and clamped to a suitable bar or frame member of the apparatus with which the device is to be associated.

Vertical adjustments of the main carriage body structure 15 are effected by means such as a hand wheel adjustment screw 32 threaded vertically through the rear end portion of the plate body 23 and cooperating with the underside of the base plate 21 rearwardly from the pivot 25.

For supporting and guiding the driving head 18 in a reciprocal forward and rearward cyclical operative range of movement, the rail side bars 22 are provided with means, herein comprising inwardly directed, coextensive upper marginal opposed longitudinal cantilever rails 33 (Figs. 4 and 5) which are appropriately spaced apart and are slidably engaged within respective complementary outwardly opening longitudinal grooves 34 provided in a pair of complementary, parallel substantially triangular side plates 35 comprising the principal supporting frame components of the driving head 18. At their forward end portions the coextensive side plates 35 normally project forwardly beyond the coextensive forward ends of the supporting rail bars 22, but short of the forward end of the supporting plate body 23, so as normally to be clear of the supporting foot 27. At their lower margins, the side plates 35 are supported close to the base plate 21 but in clearance relation thereto. Above the rail bars 22, the side plates 35 project to a substantial height with the upper rail portions thereof preferably tapered off for clearance and weight reduction purposes.

Supported between the side plates 35 and reciprocably movable as a unit therewith are a fastener driving blade 37 and a blade driving plunger 38 as well as a plunger motivating rocker lever arm member in the form of a plate 39 which forms part of the motivating mechanism 19. In addition, the side plates 35 carry the fastener magazine assembly 20 through the medium of longitudinally elongated coextensive cantilever arms 40 in the form of plate bars disposed in vertical spaced parallel planes and secured within respective complementary inwardly facing opposed recess, longitudinal channels 41 provided in the lower marginal portions of the plates 35 (Figs. 4, 5 and 6).

Means are provided whereby the driving blade 37 and the plunger 38 are guided for vertical reciprocal cyclical movement between the forward vertical margins of the side plates 35. To this end the inner faces of the forward margins of the plates 35 are provided with a plunger guideway comprising vertical grooves 42 complementary in shape to the preferably rectangular longitudinal side portions of the plunger 38 for slidably guiding the plunger which is substantially shorter than the length of the guide grooves and is connected to the driving blade 37 in a manner to have the driving blade depend therebelow. For this purpose the upper end portion of the driving blade 37 if of generally T-shape to provide a connecting head 43 which is engaged within a complementary recess 44 in the lower portion of the front face of the plunger 38.

Normally the plunger 38 and the fastener driving blade 37 are maintained by the rocker lever plate 39 in an upward position in the driving head 18 with the lower fastener driving end of the driving blade above the foremost of a series of fasteners 45, herein comprising elongated nail-like sash pins fed into position successively under the driving blade 37 from the magazine assembly 20.

Vertical fastener driving and return stroke reciprocations of the driving blade 37 and the plunger 38 as well as forward and return reciprocations of the driving head 18 are effected through the medium of the rocker lever plate 39. To this end the plate 39 is preferably of generally triangular outline having an inverted apical portion pivotally secured as by means of a pivot pin 47 in a median plane between the side plates 35 of the driving head (Figure 3). An upper forward end portion of the plate 39 is provided with an arcuate forwardly opening and inwardly and downwardly directed cam slot 48 which is in operative engagement with a roller 49 carried on a pivot pin 50 and located within a vertical front to rear median upwardly opening slot 51 in the upper portion of the plunger 38. The construction and relationship is such that when the plate 39 is rocked about its pivot 47 in a forward direction as indicated in dash outline in Figure 3, the plunger 38 and thereby the driving blade 37 are driven downwardly in the guide channels 42 by coaction of the arcuate cam surfaces provided by the slot 48 with the roller 49.

In the actuating mechanism 19, means for motivating the plate 39 comprise a motor device such as a pressure fluid operator such as a pneumatic cylinder 52 having a piston rod 53 projecting therefrom and reciprocably motivated by a piston (not shown) within the cylinder 52 driven reciprocably therein by air pressure supplied to the rear and front ends respectively of the cylinder through suitable air duct conduits 54. The piston 53 is attached to a bifurcated connector 55 within which an upper rear end portion of the plate 39 is pivotally connected by means such as a pivot pin 57. At its rear end the cylinder 52 has connecting means including an ear 58 which is pivotally connected as by means of a pin 59 between upstanding supporting ear flanges 60 of a pair of similar frame bars 61 extending longitudinally upon the base plate 21.

Since the driving head assembly 18 must be moved from its retracted, non-operating position as shown in full lines in Figures 1, 2 and 3, to a protracted operating position over the work such as a sash W shown schematically in Figure 3, and resting upon the foot 27, means are provided for locking the rocker plate 39 against rocking movement under forward thrust from the piston rod 53 until the piston rod thrust has acted through the rocker plate 39 to move the entire carriage 15 and the driving head 18 forwardly into overlying position to the work. To this end, a member in the form of a forwardly directed elongated interlock pawl finger detent 62 is provided which is mounted pivotally at its rear end portion as by means of a pivot pin 63 between the rear portions of the side plates 35 below the rear portion of the rocker plate 39. Normally an interlock tip 64 at the forward end of the detent 62 interlockingly engages a lower end portion, depending interlock lug spur-like shoulder 65 on the plate 39. Such interlock relationship of the forward interlock tip 64 and the shoulder 65 is maintained by laterally projecting respective trunnion-like arms 67 preferably disposed coaxially to project from the opposite sides of the detent 62 intermediate the rear pivoted end portion thereof and the forward interlock tip 64 thereof and outwardly through respective clearance openings 67a (Fig. 2) therefor in the side plates 35.

Normally the arms 67 are maintained in an elevated position for retaining the detent 62 interlockingly related to the rocker plate 39, and for this purpose respective longitudinal control block bars 68 are mounted upon the rail bars 22 and provide respective sliding longitudinal coplanar guide rail track surfaces 69 for roller engagement or sliding of the detent arms 67 thereon throughout the desired fore and aft reciprocal movement of the carriage 15 and the driving head 18 between the retracted and protracted limits thereof.

When the carriage 15 and driving head 18 have reached the limit of protraction as shown in dash outline in Figure 3, combination detent trip and carriage stop means become effective. To this end the detent arms 67 drop into respective upwardly opening detent releasing recesses 70 in the forward end portions of the track surfaces 69 on the control bars 68 and deep enough to drop the detent tip 64 out of engagement below the interlock shoulder 65 on the rocker arm plate 39. At the same time as the detent arms 67 drop into the recesses 70, the arms come into engagement with respective stop shoulders 71 provided by the control bars 68 to thereby define the limit of protractional movement of the carriage 15 and driving head 18. As a result, continued forward driving movement of the piston rod 53 rocks the plate 39 forwardly and downwardly about its pivot 47 and drives the plunger 38 and the driving blade 37 downwardly. This all takes place as a continuous uninterrupted forward movement imparted by the cylinder 52 and the piston rod 53. To assure positive descent of the detent arms 67 into the recesses 70, respective overhanging striper finger portions 72 are provided above the recesses 70 and the shoulders 71.

In operation, activation of the fluid operator cylinder 52 for a fastener driving power stroke, the piston rod 53 is projected and thus drives the plate 39 forwardly. Since the plate 39 is locked by the detent 62 against rocking about the pivot 47, the entire driving head 18 is immediately driven forwardly along the track bars 22. Such forward driving movement continues as long as the detent arms 67 ride upon the horizontal track surfaces 69 and until the detent arms drop into the release recesses 70 at the respective forward end portions of the control bars 68. At this point not only is the detent tip 64 released from the rocker plate shoulder 65, but the head structure 18 is stopped in its forward movement by engagement of the detent arms 67 with the stop shoulder 71. As a result, continuing protraction of the piston rod 53 causes the plate 39 to rock about its pivot 47 and thereby drive the driving blade plunger 38 and the driving blade 37 downwardly in a fastener driving and setting stroke.

As this occurs, a radius shoulder 73 forwardly adjacent to the interlock shoulder 65 on the lower portion of the plate 39 rides into superimposed relation to a complementary reentrantly radiused control surface shoulder 74 on the upper side of the forward extremity portion of the detent 62 over and rearwardly adjacent the tip 64. Hence, a latch is provided against withdrawal of the detent arms 67 from the release recesses 70 by holding down of the tip end of the detent 62 by the plate shoulder 73 working against the reentrant detent shoulder 74 throughout the fastener driving stroke of a cycle of operation of the apparatus, and until during the return stroke the plate 39 has been rocked back to the full return stroke limit position of the driver plunger 38. As the return stroke action of the fluid motor operator 52 continues through the piston rod 53, with rearward force exerted upon the head 18 through the pivot 47 of the rocker plate 39, upward camming pressure exerted upon the detent arms 67 by rear end cam surfaces defining the recesses 70 clears the detent arms 67 from the recesses and causes the forward end portion of the detent 62 to be snapped up and thereby effects resetting of the interlock tip 64 into interlocking relation to the rocker plate shoulder 65. The driving head 18 then returns to the initial position wherein the mechanism is ready for repetition of the cycle of operation.

Means are provided for effecting driving and return stroke rocking limits upon the rocker plate 39, herein in the form of a stop structure comprising a hardened sleeve 75 (Figs. 1 and 3) carried by a supporting rod pin bolt 77 secured between the upper portions of the head side plates 35 rearwardly from the plunger guideway 42 and operable within an arcuate stroke limit slot 78 in the rocker plate 39. Thus, in the retracted, starting position of the rocker plate 39 the forward end defining the slot 78 engages the stop sleeve 75 while in the limit of forward and downward rocking of the plate 39 at the end of the driving stroke thereof the rear end defining the slot 78 engages the stop sleeve 75. The arc of the slot 78 is, of course, disposed on a radius of the pivot 47.

As pointed out hereinabove, the magazine assembly 20 is supported by and is reciprocable with the driving head structure 18 by connection of the forward end portions of the elongated spaced parallel cantilever supporting bars 40 to the inner sides of the head side plates 35 within the longitudinal channels 41. In the present instance the magazine assembly 20 is constructed and arranged for supplying two rows of the fasteners 45 to be driven simultaneously by the driving plate 37 which is for this purpose provided with a pair of appropriately spaced lower terminal driving fingers 79 (Figs. 4, 5 and 6). If preferred, of course, the machine may be provided with means for supplying a single row of fasteners. For supplying the double row of fasteners 45, the magazine structure is provided with an elongated longitudinally disposed feeder bar 80 which is sufficiently narrower than the width between the bars 40 as mounted on the side plates 35 to provide between the sides of the bar 80 and the bars 40 vertical plane, longitudinal guide chamber passages for the fasteners 45. Elongated narrow spacers 81 are secured between the lower longitudinal margin of the bar 80 and the lower margins of the bars 40 and the assembly thus provided is secured as by means of pin connectors in the form of screws 82 to the lower margins of the plates 35. Rearwardly beyond the plates 35 suitable fastener devices such as screws 82 secure the several bars and the spacers 81 into rigid unitary assembly.

For supporting the fasteners 45 in minimum frictional relation in feeding position within the longitudinal passages provided therefor between the carrying bar 80 and the side plates 40 of the magazine, a monorail suspension track plate strip 83 is mounted upon the upper face of the supporting bar 80 and secured thereto as by means of screws 84. At its opposite longitudinal edges the monorail strip 83 overhangs the respective inner sides of the fastener passages and is engageable within the head notches of the fasteners whereby the fasteners are supported with the tips thereof in clearance relation to the upper edges of the spacers 81.

At its forward end portion the supporting bar 80 of the magazine approaches close to the reciprocable driving path of the driver 37 and thus serves as a rear backup for the driving blade during the driving stroke. Cooperating as a front backup for the thin driving blade 37 is a guide plate and access gate clean-out door 85 (Figs. 4 and 6). This door 85 is of a length to extend substantially above and below the magazine supporting rail structure and is of a width to extend slidably between the forward margins of the side plates 35 of the machine. A pivot pin 87 supports the upper end portion of the door 85 pivotally so as to enable swinging thereof outwardly and upwardly, while in the closed position of the door 85 it will lie in spaced parallel opposition to the forward end of the magazine bar 80 to serve as a guideway for the driving blade 37 and also to serve as a stop for the foremost of the fasteners 45 located in position under the driving blade. A transverse removable pin 88 secures the lower end portion of the door 85 in operative position but is removable for enabling swinging open of the door 85 when desired.

To assist in guiding the fasteners 45 downwardly therealong, the door 85 is provided at its inner face with respective longitudinal grooves 89 (Fig. 6) receptive of the forward longitudinal sides of the fasteners as they are fed forwardly into position under the driver projections 79. Under the forward end portion of the magazine bar 80 and in rearward spaced relation to the lower end portion of the door 85 is a fastener guiding block 90 secured in place as by means of a screw pin 91 and having in its forward face one or more fastener guiding grooves 92, as required, complementary to and cooperating with the grooves 89 in the inner face of the door member 85. At their upper ends the grooves 92 are provided with chamfered lead-in surfaces for the tips of the fasteners.

Since the forward end portion of the monorail member strip 83 receives substantial strains in service incident to driving of the fasteners 45 from the usual adhesively attached sticks thereof by which they are fed into the machine, removable means are provided for conveniently and quickly replacing the forward terminal portion of the monorail structure without requiring entire dismantling thereof. To this end, referring to Figures 6 and 7, the forward terminal portion of the monorail structure comprises a separate extension plate member 93 having its forward end spaced back slightly from the path of movement of the rear face of the driving blade 37 and sufficiently to enable clearance of the foremost of the fasteners to be driven. At its rear end the extension plate 93 abuts the forward end extremity of the monorail member 83. A reinforcing holddown means and clamp in the form of a plate 94 of substantial thickness is secured as by means of screws 95 over the contiguous ends of the monorail member 83 and the extension 93, with two of the screws 95 overlapping a countersunk screw 97 which engages the holddown plate 94 and the contiguous end portions of the monorail members and serves as a safety securement against possible vibrational loosening of the holddown plate 94.

It will be appreciated, of course, that the screws 95 and 97 extend down through the monorail members and are threadedly secured into the bar 80. Undercut laterally overhanging side flanges 98 on the plate 94 overlie the upper ends or heads of the screws 95 in slightly spaced relation. To avoid catching thereon of the fasteners 45 as they move from the member 83 onto the terminal extension rail member 93, the rear end corners of the member 93 are chamfered as indicated at 99.

In order to afford a large supply of the fasteners 45 to the driving head 18 for a long period of operation before requiring refilling of the magazine 20, the magazine assembly extends to a considerable extent rearwardly from the driving head 18 and preferably beyond the rear end portion of the supporting body carriage 15 of the machine. That is, the elongated magazine supporting bars 40 and the intervening bar 80 as well as the monorail strip 83 extend back beyond the carriage 15. This long rearward extension of the magazine creates a substantial feeding problem. This is met herein by feed mechanism 100 carried by the rear end portion of the magazine assembly 20 (Figs. 1, 2 and 8). Since in the illustrated embodiment of the invention the machine is a double fastener or pinner arangement, two of the feeder mechanisms 100 are shown, and description of one will suffice for the other.

Loading of the magazine is effected by pivotally resiliently flexing open, from the full line position shown in Fig. 8 to the dash line position, a feed door 101 attached along its lower margin to the adjacent side bar 40 of the magazine over an upper marginal cut-out 102 therein enabling placing of a stick of the fasteners 45 into supported relation on the monorail 83. The stick of fasteners can then be manually manipulated along the mono-rail strip 83 toward the front of the machine and successive sticks of fasteners loaded in until a complete load of fasteners has been supplied. Then a forwardly biased pusher 103 (Figs. 8, 9 and 10) is released against the rear of the series of fasteners or, more specifically, series of sticks of fasteners to place the same under forward feeding force. In Figures 9 and 10 the left hand pusher 103 is shown for convenience although it will be appreciated that on the right side of the magazine, illustrated in Figure 8, a right hand version of the pusher is used.

Herein, the pusher 103 comprises a pair of parallel pusher plates 104 and 105 secured on opposite sides of the forward end portion of a pusher-actuating flexible pressure feed thrust band member 107. For riding on the monorail 83, the outer of the pusher plates 105 has an overhanging hanger flange 108 which is appropriately spaced above the upper edge of the inner of the plates 104.

Since the pusher activating band member 107 must be of considerable length in order to move the pusher 103 from behind the loading point to the last fastener in the series moved into position under the driving blade, the feeder mechanism 100 includes windup and force feed biasing load means. In an effective arrangement, this includes a windup drum disk spool 109 and a biasing load drive drum wheel 110. For supporting the two drums, a platform bracket 111 is provided which may be in the form of a suitable casting having depending attachment lugs 111a (Fig. 2) along one margin secured to the adjacent side of the rear extremity portion of the magazine bar assembly.

For efficient take-up and driving of the pusher actuating band 107, the rear terminal extremity of the band is secured to the spool drum 109 for take-up and pay-off by rotation of the spool drum, and the drive drum wheel 110 is rotatably mounted for engagement with the band looped thereabout. To this end, the spool drum 109 is oscillatably rotatably mounted upon the forward portion of the supporting platform bracket 111 by means of a shaft 112 which is rotatably mounted upon the platform bracket and is suitably keyed for corotation with the spool drum 109. Turning of the shaft 112 and thereby of the drum 109 for pusher band take-up is accomplished through the medium of a crank 113 secured to the upper projecting end of the shaft 112 and manipulatable through the medium of an upwardly projecting handle 114 (Figs. 1, 2 and 5). Attachment of the rear terminal end of the band 107 to the periphery of the drum 109 may be accomplished as shown in Figure 8 by securing such terminal within a peripheral recess 115 as by means of a screw 117.

On the rearward portion of the supporting bracket 111 the drive drum 110 is mounted pivotally by means of a shaft 118 and with the outer periphery of the drum substantially on a tangent with the inner surface of the adjacent side supporting plate bar 40 so as to smoothly guide the pusher actuating band 107 looped over the drive drum 110 from the spool drum 109 into and out of the rear end of the respective fastener guide chamber passages within which the feed pusher 103 is operable. A driving relation of the periphery of the drive drum 110 with the band 107 is effected by means such as sprocket drive pins 119 projecting radially from the periphery of the drum in an equidistantly peripherally spaced series for engagement within a complementary series of sprocket pin holes 120 disposed longitudinally in the band 107 (Fig. 9).

Normal torque bias of the drive drum 110 to turn in a pusher band feeding direction is effected by means such as a clock type spring 121 coiled within an annular downwardly opening clearance chamber 122 within the drum 110, with the inner end of the spring anchored to a pin 123 mounted on the supporting bracket 111, and the outer end extremity of the spring secured as by means of a screw 124 to the inner wall defining the outer or peripheral flange of the drive drum about the chamber 122. Through this arrangement, when the feeding pressure band 107 is taken up by winding the same onto the spool drum 109, the drive drum 110 is rotated counterclockwise as seen in Figure 8 for thereby winding and loading the spring 121.

In order to avoid any possible expansion escape or buckling of the band 107 away from the respective drums 109 and 110, an upstanding curb flange 125 is provided on the supporting platform bracket 111 and extends in substantially curling, uniformly spaced encompassing complementary relation about the critical peripheral portions of the drums.

In order to hold the fastener feed pusher 103 in retracted position during loading of the magazine with fasteners, a detent plunger 127 is mounted on the magazine side bar 40 rearwardly adjacent the loading opening 102 to project through a guide aperture 128 in the magazine bar from within an outwardly projecting hollow thimble-like boss 129 mounted fixedly on the bar. Normally the detent plunger 127 is biased inwardly into operative relation by means of a spring 130. Release of the plunger is effected manually by manipulation of a knurled head 131 at the outer end thereof for retracting the same in opposition to the spring 130. When the pusher band 107 has been taken up until the pusher 103 is retracted rearwardly past the plunger 127, the detent plunger snaps into pusher restraining relation in front of the forward edge of the pusher, so that when the wind-up crank 113 is released after such take-up the drive drum 110 will be held in loaded thrusting or driving relation but inactive until the plunger 127 is released, whereupon the pusher 103 will snap into feeding relation to the fasteners 45 that have been loaded into the magazine.

Means are provided for signaling exhaustion or near exhaustion of the fasteners in the magazine. Herein such means comprise an electrical system (Fig. 11) including signal lights or other signaling devices 132 mounted at some suitable place in relation to the machine and located in a normally open electrical circuit with respect to each of the feed mechanisms 100 of the machine. In each of the signal circuits is provided a feed responsive switch 133 normally biased as by means of a spring 134 toward closed position but held open during normal fastener feeding condition in the respective magazine by the band 107 against a control plunger 135.

As best seen in Figure 8 the control plunger 135 in each instance is reciprocably mounted within a housing 137 carried by the supporting platform bracket 111 intermediate the spool 109 and the drive drum 110 and with the head of the plunger 135 bearing toward and into engagement with the adjacent face of the pusher band 107. Near the rear end of the band 107 is provided a longitudinally elongated aperture slot 138 into which the head of the switch control plunger 135 may protrude when such slot comes into register with the plunger head, thus closing the circuit. Since the slot 138 is preferably disposed in line with the sprocket pin apertures 120, the plunger 135 in the head portion thereof is preferably enlarged, as for example in a loop form as shown so as to avoid entry thereof into the apertures 120, but only into the elongated slot 138 provided for the switch plunger. Moreover, the plunger head is rounded so that it will freely ride out of the slot 138 as an incident to winding up of the band 107 onto the take-up disk drum 109. The signal circuit may be provided with a master switch 139, and with a by-pass testing circuit arrangement including a normally open testing switch 140.

Although the machine as thus far described has been shown as adapted for driving pin or nail type fasteners, only slight modification enables the machine to be used for driving other types of fasteners such as staples 141 (Fig. 12). In such event the central supporting bar 80 of the magazine structure may be dimensioned to carry the staples thereon as a supporting rail. The driving tip of the driving plunger 137 is modified to drive the staples. Otherwise the structure and assembly of the machine and its operation may be substantially the same as already described.

Where, herein, parts have been described as fixedly secured together, without a showing of any particular means for securing the same, it will be understood that the securing means may comprise welding or screws or other suitable fastening means.

In order to protect the rearwardly projecting portion of the magazine and feed assembly 20, a guard plate 142 mounted on the rear end portion of the carriage plate 21 is disposed in underlying relation to the feed mechanism (Figs. 1, 2, 5 and 8).

In operation, after the magazine 20 has been loaded with fasteners, and the pushers 103 released for thrusting the fasteners forwardly toward the gate 85, and a work piece to receive one or more of the fasteners has been placed on the foot 27, the motor fluid operator 52 is actuated for driving the head 18 forwardly until it is protracted and the driver 37 overlies the work as shown in dash outline in Figure 3. Continuing movement of the piston rod 53 causes the lever plate 39 to trip and drive the plunger 38 and the driver blade in a fastener driving stroke. Immediately thereafter, the motor device 53 is reversed and thereby reverses the rocking movement of the lever plate 39 for returning the plunger 38 and the driving blade 37 to raised, starting position. Then the head 18 is returned or retracted on the carriage 15 to the starting position in the operating cycle.

It will be understood that modifications and variations may be effected without departing from the scope of the novel concepts of the present invention.

I claim as my invention:

1. In a fastener driving machine, a supporting structure including a track and work supporting means beyond and below one end of said track, a driving head supported by said track for reciprocable movement into position over a work piece on said work supporting means and return to a clearance position relative to the work piece, a fastener driver supported by said head and movable therewith as well as relative thereto, and means for motivating the driving head on said track between said positions and for transversely motivating said driver in a driving and a return stroke relative to said head, said means including a member pivotally mounted on said head for relative rocking movement on said head and power means carried by said supporting structure separate from said head but connected to the head through said relatively pivotally mounted member.

2. In a fastener driving machine, a supporting structure, a driving head supported for reciprocable movement by said structure into position over a work piece and return within reciprocable limits, a fastener driver supported by said head and movable therewith as well as relative thereto, and means for motivating the driving head between said reciprocal limits and for motivating said driver in a transverse driving and a return stroke relative to the reciprocable movement of said head, said means including a member mounted for relative movement on said head, power means carried by said supporting structure separate from said head but connected to the head through said relatively movable member, and automatically releasable interlock means operable for holding the relatively movable member against movement while the head is driven toward the position over the work and then releasable for actuation by said relatively movable member of the driver in a driving stroke.

3. In a fastener driving machine, a supporting structure, a reciprocable driving head carried by said structure, a driving blade carried by said head, and means for motivating said head and said driving blade including a rocker lever member and a control detent cooperable with the lever member operable to hold the lever member against rocking while the carriage is moving toward one limit of reciprocal movement but releasable in such limit of movement to free the lever member for rocking to drive the driving blade in a fastener driving stroke.

4. In a fastener driving machine, a carriage, a driving head guided by said carriage for movement into and out of driving position relative to work to receive a fastener, a driver carried by said head, a rockable member carried by the head for moving said driver in fastener driving and return strokes, means for reciprocating said head and for rocking said rockable member, detent means for said rockable member carried by said head, said detent means and said rockable member having interengageable shoulders, and means operable to main-

11 tain said detent means in position to have the shoulders interengaged until the driving head is in position over the work when the detent is releasable for operation of the rockable member and the driver for driving a fastener into the work.

5. In a fastener driving machine, a carriage, a driving head guided by said carriage for movement into and out of driving position relative to work to receive a fastener, a driver carried by said head, a rockable member carried by the head for moving said driver in fastener driving and return strokes, means for reciprocating said head and for rocking said rockable member, detent means for said rockable member carried by said head said detent means and said rockable member having interengageable shoulders, and means operable to maintain said detent means in position to have the shoulders interengaged until the driving head is in position over the work when the detent is releasable for operation of the rockable member and the driver for driving a fastener into the work, said detent means and said rockable member having interengageable relatively movable portions cooperable after the rockable member is released for driving the driver to maintain the detent means in a locked position and interlockingly related to said controlling means to hold the driving head against return until the rockable member has returned the driver from its driving stroke position.

6. In a fastener driving machine, carriage structure, a fastener driving head assembly supported by said carriage structure for movement in a predetermined path into and out of fastener driving position, fastener supply means for said head, a fastener driver carried by said head and movable relative thereto for driving fasteners successively, a power source associated with said carriage structure, lever means carried by the head assembly and connected to the power source and to said driver and operable as motivated by said power source for both effecting said movement of the head assembly and said movement of said driver, and means controlling said lever means by positional response in a cycle of said movement of the head assembly to restrain said lever means from moving said driver until the driving position of the head assembly is attained and then acting to retain the head assembly against movement out of the fastener driving position until the cycle of said movement of the driver has been completed, said controlling means comprising a detent member supported by the head assembly and combination trip and stop means carried by the carriage and cooperable with the detent.

7. In a fastener driving machine, a carriage structure, a driving head assembly mounted on the carriage structure for reciprocation into and out of fastener driving position, a fastener driver carried by the driving head and movable relative thereto for driving fasteners, means for supplying fasteners to the driver, combination driving head assembly motivating and driver moving means including a member carried relatively movably by the head assembly and connected operably to the driver, a detent member carried by the head assembly and acting to retain said motivating member against movement relative to the head assembly except when the head assembly is in fastener driving position, and combination trip and stop means coactive with said detent member to effect release thereof from said motivating member and coacting with the detent member to retain the driving head in the fastener driving position until the driver has completed a fastener driving cycle by the action of said motivating member.

8. In a fastener driving machine, a carriage structure, a driving head assembly including a fastener driver and a rock lever member rockable to actuate the fastener driver in a cyclical driving stroke, means for driving the head assembly reciprocably on the carriage structure and having a connection with said rock lever member, the rock lever member having an interlock shoulder, a detent carried by the head assembly and normally biased into interlocking engagement with said interlock shoulder to retain the rock lever member in a pre-driving relation to the driver, and trip means operable in the fastener driving position of the head assembly to release the detent from the rock lever member.

9. In a fastener driving machine including a carriage structure and a head assembly reciprocably supported by the carriage structure and having a fastener driver with means for supplying the driver with fasteners, a combination head assembly motivating and driver actuating rock lever plate pivotally mounted on the head assembly and having connection with driving means and another connection with the driver, a detent member pivotally mounted on the head assembly, the rock lever plate having an interlock shoulder and the detent member having an interlock tip engageable with the shoulder, means normally biasing the detent member for interlocking of said shoulder and tip to hold the rock lever plate in a position wherein the driver is held poised for driving a fastener, and means operable when the head assembly has been moved into position for fastener driving to positively swing the detent to release said tip from said shoulder to free the rock lever plate for rocking by said power means to actuate the driver in a driving stroke, said detent member and said rock lever plate having coacting means coacting with said releasing means to maintain the head assembly locked against return from the fastener driving position until the rock lever plate has completed a rocking cycle and the driver has returned to its poised position.

10. In a fastener driving machine, a carriage having an elongated base structure, longitudinal track means on said base structure, a driving head assembly mounted for reciprocation longitudinally along said track means between a work overlying position and a retracted position and having a forward portion carrying fastener driver and means for supplying fasteners to said driver, a motor mounted on the carriage base spaced rearwardly from the driving head, and a combination driving head motivating and driver actuating lever structure carried by the head and connected to said motor and operable by the motor for reciprocating the head and, in the work overlying position of the head on the track actuating the driver to drive fasteners into the work.

11. In a fastener driving machine, carriage structure, a fastener driving head assembly supported by said carriage structure for movement in a predetermined path into and out of fastener driving position, fastener supply means for said head, a fastener driver carried by said head and movable relative thereto for driving fasteners successively, a power source comprising a fluid motor mounted on said carriage structure, lever means carried by the head assembly and connected to the power source by an extensible connection, said lever also being connected to said driver and operable as motivated by said power source through said extensible connection for both effecting said movement of the head assembly and said movement of said driver, and means controlling said lever means by positional response in a cycle of said movement of the head assembly to restrain said lever means from moving said driver until the driving position of the head assembly is attained and then acting to retain the head assembly against movement out of the fastener driving position until the cycle of said movement of the driver has been completed.

References Cited in the file of this patent

UNITED STATES PATENTS

| | | |
|---|---|---|
| 1,821,966 | Goddu | Sept. 8, 1931 |
| 1,842,796 | Morgan | Jan. 26, 1932 |
| 2,004,355 | Twomley | June 11, 1935 |
| 2,087,779 | Pankonin | July 20, 1937 |

(Other references on following page)

UNITED STATES PATENTS

| | | |
|---|---|---|
| 2,185,751 | Peterson | Jan. 2, 1940 |
| 2,500,217 | Taylor | Mar. 14, 1950 |
| 2,519,617 | Wember | Aug. 22, 1950 |
| 2,536,350 | Burby | Jan. 2, 1951 |
| 2,539,599 | Tubbs | Jan. 30, 1951 |
| 2,544,499 | Hovey | Mar. 6, 1951 |
| 2,588,929 | Jacobus | Mar. 11, 1952 |
| 2,635,235 | Green | Apr. 21, 1953 |
| 2,651,775 | Sasser | Sept. 15, 1953 |
| 2,656,537 | Geel | Oct. 27, 1953 |